United States Patent [19]

Sampson

[11] 4,257,642

[45] Mar. 24, 1981

[54] GASOLINE FILL COVER HOLDING ARM

[76] Inventor: John S. Sampson, 520 2nd St., S.E., Hampton, Iowa 50441

[21] Appl. No.: 494

[22] Filed: Jan. 2, 1979

[51] Int. Cl.³ .............................................. B62D 63/04
[52] U.S. Cl. ..................................... 296/1 C; 292/338
[58] Field of Search ........ 296/1 C; 292/338, DIG. 15

[56] References Cited

U.S. PATENT DOCUMENTS

| 3,287,050 | 11/1966 | Ferrante | 292/338 |
| 3,905,637 | 9/1975 | Smith | 296/1 C |
| 4,172,611 | 10/1979 | Krus | 296/1 C |

OTHER PUBLICATIONS

Popular Science, Nov. 1941, p. 141.

*Primary Examiner*—John J. Love
*Assistant Examiner*—Ross Weaver
*Attorney, Agent, or Firm*—Henderson & Sturm

[57] ABSTRACT

In combination with a license plate holder, spring-hinged gasoline fill cover of the type used in conjunction with center gasoline fill openings provided at the rear of motor vehicles, a hinged device for holding the cover in its horizontal, or refueling position. The device consists of a base plate rigidly secured to the vehicle chassis, and pivotally attached to a holding arm wherein, once the cover is pivoted to its horizontal position, the holding arm is free to pivot in a horizontal plane above the fill cover, from a normal resting position to a substantially perpendicular holding position to hold the fill cover horizontally against spring force.

1 Claim, 4 Drawing Figures

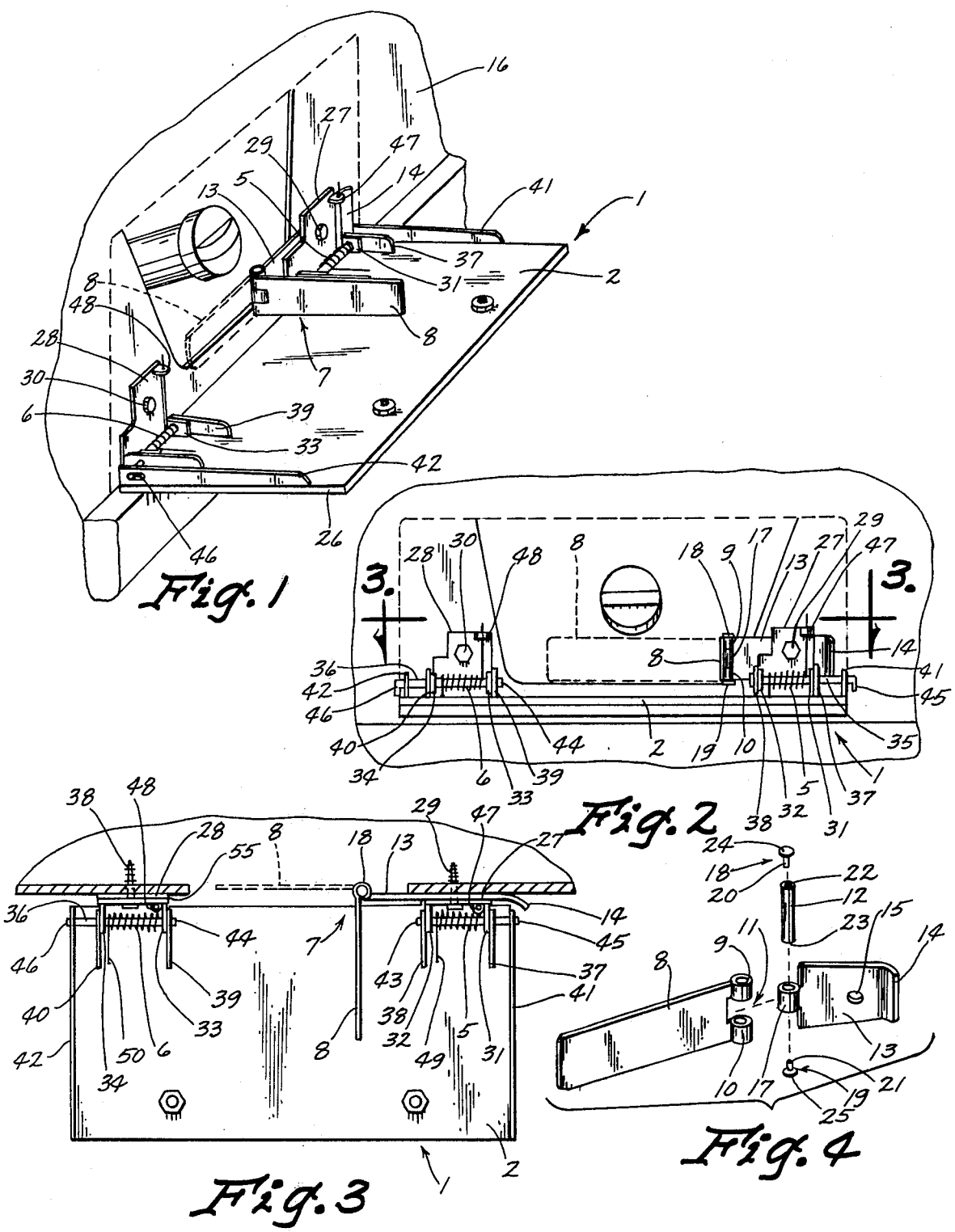

GASOLINE FILL COVER HOLDING ARM

BACKGROUND OF THE INVENTION

For a number of years automobile manufacturers have been providing a center gasoline fill opening at the rear of certain motor vehicle models, and providing in conjunction therewith a combination license plate holder, spring-hinged gasoline fill cover which is hinged along the bottom edge and spring biased to a normal vertical position. This vertical position allows a clear view of the license plate for easy identification of the vehicle during normal operation. To permit refueling of the vehicle, the cover is manually pivoted to a horizontal position to expose the fill opening. The cover must then be held in this horizontal position while the gasoline pump nozzle is inserted in the fill opening. Additionally, it is wise to continue to manually hold the cover during refueling to prevent the spring force of the cover from pushing the nozzle out of the fill opening creating the danger of fire or explosion.

The necessity of manually holding the cover has thus proved to be awkward, inconvenient, and somewhat hazardous. To eliminate this problem the present invention is designed to securely hold the cover in the horizontal or refueling position. This eliminates the need for manually holding the cover either while inserting the nozzle in the fill opening or during refueling.

There is no known prior art which discloses the concept of such a holding device or suggests it in any way.

The invention as herein disclosed primarily involves the addition of a holding arm member which is pivotally attached to the chassis. The device is so designed that once the fill cover is pivoted to its horizontal, or refueling position, the holding arm can be pivoted outwardly to block the movement of the cover and resist the spring force. The awkwardness and inconvenience of having to manually hold the cover is thus eliminated. Moreover, the device prevents the cover from pushing the nozzle out of the fill opening while refueling is taking place and thereby eliminates a hazardous condition.

Additionally, the present invention has been designed for easy and low cost manufacture and installation, without the need for further or special machining of the chassis or even for additional fastening means.

Therefore, the present invention is not only convenient and safe to use, but also very inexpensive to manufacture and install.

SUMMARY OF THE INVENTION

The present invention is an improvement on the combination license plate holder, spring-hinged gasoline fill cover so common in use with center gasoline fills located at the rear of motor vehicles. The customary license plate holder, fill cover device is pivotally attached along its lower edge to the vehicle chassis, and spring biased to a normal vertical position to permit a clear view of the license plate for easy identification of the vehicle during normal operation. To refuel the gasoline tank, the cover is manually pivoted to a horizontal position to expose the fill opening. The cover must then be manually held against spring tension both while the pump nozzle is being inserted in the fill opening, and also during refueling so that the spring force on the cover does not dislodge the nozzle and cause spillage.

The present invention is a device for holding the fill cover in the horizontal position for convenience during refueling. The preferred embodiment of the present invention is a hinge type device comprised of a base plate which is rigidly secured to the vehicle chassis, and pivotally attached to a holding arm member. The holding arm member is, thus, pivotally attached to the chassis, and is free, when the cover is horizontal, to pivot outwardly from a normal resting position to a substantially perpendicular holding position. In the holding position, the arm securely holds the cover horizontally against spring force, eliminating the need to manually hold the cover.

As a further aspect of the present invention, it is designed to permit inexpensive manufacture, and easy installation on the vehicle chassis without the need of any further or special machining.

An object of the present invention is to provide a device for conveniently holding a combination license plate holder, spring-hinged gasoline fill cover in the horizontal position during refueling to eliminate the need for manually holding the cover.

Another object of the present invention is to provide a holding device for a combination license plate holder, spring-hinged fill cover which is inexpensively and easily installed on the chassis without the need for additional or special machining, or even for an additional fastening means.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the preferred embodiment of the present invention used in combination with a customary spring-hinged gasoline fill cover;

FIG. 2 is an elevational view of the preferred embodiment of the present invention showing the spring-hinged gasoline fill cover in the horizontal position;

FIG. 3 is a plan view taken along line 3—3 of FIG. 2; and

FIG. 4 is an exploded view in perspective of the preferred embodiment of the present invention.

DESCRIPTION OF THE PREFERRED EMBODIMENT

A conventional spring-hinged cover member for a center gasoline fill opening at the rear of a motor vehicle is shown in FIG. 1 where it is generally indicated by the numeral 1. Normally, such a cover member also serves as a license plate holder.

Deferring, for the moment, the description of the preferred embodiment of the present invention, the well known spring-hinged fill cover includes primarily three elements. These are the combination cover member, license plate holder, means for pivotally attaching the cover member to the vehicle chassis, and spring means for biasing the cover member to a substantially vertical position.

The combination cover member, license plate holder is generally designated by the numberal 2. It is a flat plate type member suitable for supporting a license plate 26, and for pivotal connection with the chassis.

Various means are obviously available for pivotally attaching cover member 2 to the chassis. Here, pivot shafts 35 and 36 pivotally attach cover 2 to brackets 27 and 28. The brackets 27 and 28 are rigidly secured to chassis 16 by means of sheet metal screws 29 and 30.

Disposed outwardly from and formed in planes perpendicular to brackets 27 and 28 are pairs of parallel ears 31 and 32, and 33 and 34, respectively. A circular hole is formed in each of the ears to accomodate pivot shafts 35 and 36. Complementing pairs of parallel ears 37 and 38, and 39 and 40 depend outwardly in perpendicular planes from cover member 2. Cover ears 37 and 38 are located and spaced to fit just to the outside of bracket ears 31 and 32, respectively. Likewise, cover ears 39 and 40 are spaced to fit just to the outside of bracket ears 33 and 34, respectively. A circular hole is formed in each of these cover ears to align with the holes in the bracket ears. The holes are suitable in size to accomodate pivot shafts 35 and 36. The outward side edges of cover member 2 are turned up to form perpendicular flanges 41 and 42. A circular hole is formed in each of these flanges to accomodate pivot shafts 35 and 36, respectively, and align with the circular holes in the cover ears 37, 38, 39 and 40. Each of the pivot shafts has a wider head portion 43 and 44. The above-described structural features create a pivotal attachment between cover member 2 and brackets 27 and 28 as described herein.

The four bracket ears 31, 32, 33 and 34 are aligned with the four cover ears 37, 38, 39 and 40. Pivot shaft 35 is then inserted through cover ear 38, through ears 32, 31 and 37, and then through flange 41, in sequence. With pivot shaft head 43 flush with ear 38, that part of pivot shaft 41 which extends outward from flange 41 is bent to form end portion 45 which secures pivot shaft 35 in place. The same procedure is followed with pivot shaft 36 to form a pivotal connection between cover member 2 and bracket 28. Thus, a pivotal connection is formed which permits cover member 2 to pivot with respect to brackets 27 and 28, and hence, with respect to chassis 16.

Several different types of spring means have, of course, been employed to bias such a pivotally attached cover member to a substantially vertical position. Here, springs 5 and 6 have been mounted upon pivot shafts 35 and 36, respectively, such that the shafts run through the center of the springs. The springs 5 and 6 are then connected to brackets 27 and 28 at 47 and 48, respectively, and to cover member 2 at 49 and 50, respectively. Consequently, cover member 2 is spring biased with respect to chassis 16. Springs 5 and 6 are biased to a closed position wherein they hold the cover 2 in a substantially vertical position as indicated by the dotted lines in FIGS. 1 and 2.

This spring-hinged fill cover device is a common feature on automobiles, and its operation is well known. To expose the fill opening for refueling, cover 2 is manually pivoted against spring tension to a substantially horizontal position. The cover 2 must then be manually held in this position to permit refueling. Once refueling is completed, the cover 2 is released and automatically springs back to its substantially vertical position so as to provide a clear view of the license plate for easy identification of the vehicle.

The present invention is an improvement on this spring-hinged fill cover, license plate holder device wherein a holding means is provided to hold the cover 2 in its substantially horizontal position for convenience during refueling.

In FIG. 1, the preferred embodiment of this holding means is generally designated by the numeral 7. The preferred embodiment is a hinged structure comprised of a base plate 13 rigidly secured to the chassis 16, and pivotally attached to a holding arm 8.

Holding arm 8 is best seen in FIG. 4. Arm 8 is a flat longitudinal plate structure substantially rectangular in shape. At one of its ends two cylindrical loops, upper loop 9 and lower loop 10 are formed. The loops are disposed horizontally from the end edge of arm 8, and are spaced in a vertical relation separated by space 11 such that the top edge of upper loop 9 is in line with the upper edge of arm 8, and the bottom edge of lower loop 10 is in line with the lower edge of arm 8. A tangential wall section of each of the loops lies in the same plane as the main portion of holding arm 8, the remaining portions of loops 9 and 10 being in front of the plane as seen in FIG. 4. Cylindrical loops 9 and 10 have internal diameters of sufficient size to accomodate hinge pin 12 with suitable clearance to permit pivotal operation. Holding arm 8 is of sufficient length to hold cover 2 in horizontal position against spring force, as shown in FIG. 1, but is not so long as to extend beyond head portion 44 of pivot shaft 36 as shown by the dotted lines in FIG. 2.

The base plate member 13 is also best seen in FIG. 4. Base plate 13 is a longitudinal plate substantially rectangular in shape. An end portion 14 is disposed at an acute angle so that it is bent away from chassis 16 as seen in FIG. 1. A hole 15 is formed on plate 13 in a location adapted to align with the hole formed in bracket 27. Hole 15 is of suitable size to accomodate screw 29 which also passes through bracket 27. Screw 29, thus, rigidly fastens both base plate 13 and bracket 27 to the chassis 16. A leveling plate 55 may be provided as well. See FIG. 3.

The present invention is, therefore, designed for easy and inexpensive installation without the necessity of additional or special machining of the chassis 16. At the end opposite to end portion 14, cylindrical loop 17 is formed. Loop 17 is disposed horizontally from the end of base plate 13, and is centered on the longitudinal centerline of the plate 13. Cylindrical loop 17 is of sufficient internal diameter to accomodate hinge pin 12, and of sufficient height to fit within space 11 of holding arm 8 with suitable clearance to permit a pivotal connection. One tangential section of the cylinder wall of loop 17 lies in the same plane as the main portion of base plate 13, the remainder of loop 17 being substantially behind the plane as shown in FIG. 4.

The pivotal connection is formed by inserting cylindrical loop 17 of base plate 13 into space 11, and thus, between interlocking cylindrical loops 9 and 10, of holding arm 8. Loops 9, 10 and 17 are then alligned to permit the insertion of hinge pin 12 which is secured by rivets 18 and 19. Hinge pin 12 is best seen in FIG. 4. It is a solid cylindrical bar of suitable diameter to fit within the cylindrical loops 9, 17 and 10, allowing sufficient clearance to prevent binding. Pin 12 is in length equal to the vertical distance between the upper edge of loop 9 and the lower edge of loop 10. The pin 12 is fully inserted to run along the full length of the aligned interlocking loops 9, 10 and 17 with its top and bottom ends flush with the top and bottom edges, respectively, of loops 9 and 10. Pin 12 is held in place against vertical movement with respect to the loops by means of rivets 18 and 19. The pin 12 has concentric cylindrical cavities 22 and 23 bored out of each of its ends to accomodate the cylindrical post portions 20 and 21 of rivets 18 and 19, respectively. The respective diameters of rivet posts 20 and 21 and cylindrical cavities 22 and 23 are suitably related to form force fit connections. Rivets 18 and 19 are equiped with rivet heads 24 and 25, respectively. Rivet heads 24 and 25 are larger in diameter than hinge pin 12 to restrain the pin 12 against vertical movement.

Thus, holding arm 8 is pivotally connected to base plate 13 by means of hinge pin 12 and rivets 18 and 19. In that plate 13 is rigidly fastened to chassis 16, arm 8 also pivots with respect to the chassis 16.

The operation of this holding device improvement on the customary spring-hinged fill cover is quite simple. When fill cover 2 is in its normal substantially vertical position, indicated by the dotted lines in FIG. 1, arm 8 is in its normal resting position also indicated by dotted lines in FIG. 1. However, once fill cover 2 is manually pivoted downward to the substantially horizontal position, arm 8 is free to be manually pivoted to its holding position as shown in FIG. 1. In this position holding arm 8 holds fill cover 2 in the substantially horizontal position against spring force to expose the fill cap. This eliminates the necessity of manually holding cover 2 both while inserting the pump nozzle into the fill opening, and during refueling. Once the refueling is complete, cover 2 is pressed down slightly to free arm 8 from contact with the cover 2. Arm 8 is then manually pivoted back to its normal resting position indicated by the dotted lines in FIG. 1. Cover 2 is released, automatically springing back to its normal substantially vertical position, indicated by dotted lines in FIG. 1. In this position, the license plate is exposed to view so the vehicle can be readily identified.

Obviously many modifications and variations of the present invention are possible in light of the above teachings. It is therefore to be understood that, within the scope of the appended claims, the invention may be practiced otherwise than as specifically described.

I claim:

1. In combination with a fill cover pivotally attached to a motor vehicle chassis by a pair of spring hinges, each of said spring hinges having a mounting aperature and a mounting screw installed through each of said mounting aperatures, said mounting screws being threadbly received within said chassis, said mounting screws securing said spring hinges to said chassis, said spring hinges biasing said fill cover to a substantially vertical position, the improvement comprising:

a hinge secured to said chassis intermediate the means pivotally attaching the fill cover to said chassis and operatively connected to one of said spring hinges, which comprise said means, said hinge having a base member in pivotal connection with an arm member, said base member having a mounting aperature, said mounting aperature of said base member being installed in alignment with said mounting aperature of one of said spring members one of said mounting screws being installed through said mounting aperature of said base member and through said mounting aperature of one of said spring hinges, said mounting screw being threadably received within said chassis, said mounting screw rigidly securing said spring hinge and said base member to said chassis, said arm member being thereby pivotally secured to said chassis, said arm member being pivotally moveable to a holding position wherein said arm member holds said fill cover in a substantially horizontal position.

* * * * *